United States Patent [19]

Merkovsky et al.

[11] Patent Number: 4,716,004
[45] Date of Patent: Dec. 29, 1987

[54] THIMBLE GUIDE EXTENDER

[75] Inventors: Daniel Merkovsky, Monroeville; Michael R. Gasparro, Penn Hills, both of Pa.

[73] Assignee: Westinghouse Electric Corp., Pittsburgh, Pa.

[21] Appl. No.: 826,522

[22] Filed: Feb. 6, 1986

[51] Int. Cl.⁴ .............................................. G21C 17/00
[52] U.S. Cl. .................................. 376/203; 376/245; 376/254; 376/285; 376/292
[58] Field of Search ............... 376/175, 176, 352, 353, 376/364, 365, 245, 254, 255, 260, 449, 450, 446, 463, 203, 285, 292

[56] References Cited

U.S. PATENT DOCUMENTS

| | | | |
|---|---|---|---|
| 3,200,045 | 8/1965 | Vendryes et al. | 376/175 |
| 3,235,463 | 2/1966 | Sankovich | 376/175 |
| 3,816,245 | 6/1974 | Bevilacqua | 376/282 |
| 3,867,253 | 2/1975 | Gratton et al. | 376/364 |
| 3,971,698 | 7/1976 | Wolff et al. | 376/364 |
| 4,198,272 | 4/1980 | Salmon | 376/175 |
| 4,202,726 | 5/1980 | Duncombe et al. | 376/175 |
| 4,323,428 | 4/1982 | Schallenberger et al. | 376/364 |
| 4,381,284 | 4/1983 | Gjertsen | 376/364 |

FOREIGN PATENT DOCUMENTS 0221696 12/1984 Japan .................................. 376/450

Primary Examiner—Deborah L. Kyle
Assistant Examiner—Daniel Wasil
Attorney, Agent, or Firm—Daniel C. Abeles

[57] ABSTRACT

A thimble guide extender for use in a nuclear power plant provides a shielded passage beteewn the guide and the bottom nozzle of a fuel assembly to protect the thimble from turbulence. The extender includes a hollow element having an upper portion which contacts the bottom nozzle, a lower portion which extends around the sides of the thimble guide, and a thimble passage through which the thimble movably extends. In one embodiment the thimble passage is aligned with a channel in the thimble guide by being permanently attached to the bottom nozzle of the fuel assembly. For this purpose the hollow element is provided with locking fingers which extend into flow openings in the bottom nozzle. In another embodiment the thimble passage of the hollow element is aligned with the channel of the thimble guide by being operatively mounted on the thimble guide, with spring fingers having enlarged regions or with locking balls fitting into an annular groove in the thimble guide. The enlarged regions or locking balls are locked into place to prevent the extender from becoming detached.

12 Claims, 9 Drawing Figures

THIMBLE GUIDE EXTENDER

BACKGROUND OF THE INVENTION

The present invention relates to an extender for a thimble guide in a nuclear power plant, and more particularly to an extender which telescopically cooperates with the thimble guide to provide a shielded passage for the thimble right up to the bottom nozzle of a fuel assembly.

A typical pressurized water reactor 6 is schematically illustrated in FIG. 1 and includes a reactor vessel 7 which contains nuclear fuel, a coolant (water) which is heated by the nuclear fuel, and means for monitoring and controlling the nuclear reaction. The reactor vessel 7 is cylindrical, and is provided with a permanent hemispherical bottom and a removable hemispherical top. Hot water is conveyed from and returned to vessel 7 by a reactor coolant system which includes one or more reactor coolant loops 8 (usually two, three, or four loops, depending upon the power-generating capacity of the reactor, although only two loops are illustrated in FIG. 1). Each loop 8 includes a pipeline to convey hot water from the reactor vessel 7 to a steam generator 9, a pipeline to convey the water from the steam generator 9 back to the reactor vessel 7, and a pump 10. A steam generator 9 is essentially a heat exchanger which transfers heat from the reactor coolant system to water received at inlet 11 from a source that is isolated from the reactor coolant system; the resulting steam is conveyed via outlet 12 to a turbine (not illustrated) to generate electricity. During operation of the reactor 6, the water within the vessel and the coolant system is maintained at a controlled high pressure by pressurizer 13 to keep it from boiling as it is heated by the nuclear fuel.

Nuclear fuel is supplied to the reactor vessel 7 in the form of a number of fuel assemblies. Each fuel assembly includes a base element called a bottom nozzle and a bundle of fuel rods and tubular guides which are supported on the bottom nozzle. The fuel rods have cylindrical housings which are filled with pellets of fissionable material enriched with U-235. The tubular guides accommodate measuring instruments and movably mounted control rods of neutron-moderating material. A typical fuel assembly for a pressurized water reactor is about 4.1 meters long, about 19.7 centimeters wide, and has a mass of about 585 kg, and a typical four loop reactor might contain 196 such fuel assemblies supported parallel to one another on a core plate within the reactor vessel. After a service life during which the U-235 enrichment of the fuel assemblies is depleted, the reactor 6 is shut down, the pressure within the vessel 7 is relieved, the hemispherical top of the vessel is removed, and the spent fuel assemblies are replaced by new ones.

A number of measuring instruments are employed to promote safety and to permit proper control of the nuclear reaction. Among other measurements, a nuetron flux map is generated periodically, such as every 28 days, using data gathered by neutron flux detectors which are moved through a number of randomly selected fuel assemblies. To guide the flux detectors during their periodic journeys, closed stainless steel tubes known as flux thimbles extend through the bottom of the reactor vessel 7 and into the fuel assemblies which have been selected as measuring sites. This will be explained in more detailed with reference to FIG. 2.

In FIG. 2, a thick lower core plate 14 is horizontally mounted within reactor vessel 7, with reference number 15 identifying a portion of the hemispherical bottom end wall of the vessel 7. A number of fuel assemblies, including fuel assembly 16, are supported in an orderly array on plate 14. Fuel assembly 16 includes a bottom nozzle 17 having four legs 18 which are joined to a platform portion 20 with a centrally disposed aperture 22 in it. In addition to aperture 22, platform portion 22 has a number of flow openings 23 (only two of which are illustrated in FIG. 1B) to facilitate the circulation of water through fuel assembly 16. A number of fuel rods 24 are bundled together and supported on platform portion 20 at portions that are out-of-alignment with the flow openings 23. Within this bundle is an instrumentation tube 25 which is aligned with aperture 22 and which extends to the top nozzle (not illustrated) of fuel assembly 16.

A bore 26 having a threaded region 28 extends through core plate 14 in alignment with aperture 22. A conventional thimble guide 30, which may be configurated as illustrated in FIG. 2, is provided with a threaded portion and with a recessed wrench-engaging region 32 which permits technicians to screw guide 30 into threaded region 28 of plate 14 during fabrication of the reactor vessel 7. An annular groove 33 is positioned beneath region 32. After guide 30 is screwed into place, welds 34 are added for additional security. Typically guide 30 is 3.38 inches (8.58 cm) high, from the upper surface of plate 14 to the upper lip 35 of guide 30, and there is a gap of 1.37 inches (3.48 cm) between upper lip 35 and aperture 22.

A bore 36 extends through vessel wall 15 in alignment with bore 26. A vessel-penetration sleeve 38 having an outer diameter of about 1.5 inches (3.81 cm) extends through bore 36 and is welded at 40 to provide a seal which is resistant to high pressure. A bottom mounted instrumentation column 42 mounted on plate 14 extends between bore 26 and sleeve 38. Column 42 includes a fitting 44 which is attached to plate 14 by bolts 46, an upper pipe element 48 which is joined to fitting 44 by welds 50, and a lower pipe element 52 which is joined coaxially to element 48 at a tie plate (not illustrated). Lower pipe element 52 has an inner diameter of 2 inches (5.08 cm), so that there is a gap between sleeve 38 and element 52.

In a typical four-loop pressurized water reactor (having 196 fuel assemblies 16), 58 of the fuel assemblies 16 would be randomly selected for neutron flux monitoring. Accordingly, in such a reactor it will be apparent that there would be 58 guides 30, each communicating via a respective bore 26 and bottom mounted instrumentation column 42 with a respective vessel-penetration sleeve 38. During fabrication, sleeves 38 would be installed in the reactor vessel wall 15 and guides 30 and bottom mounted instrumentation columns 42 would be installed on core plate 14, the columns 42 being secured to one another by tie plates (not illustrated). Then the core plate 14 and attached structures would be lowered into the vessel, with the sleeves 38 fitting into elements 52. In the resulting structure, the upper ends (not illustrated) of sleeves 38 are spaced apart from the lower ends (not illustrated) of upper pipe elements 48, so that sleeves 38 are not in fluid-tight communication with bottom mounted instrumentation columns 42.

The bore 54 of upper pipe element 48 typically has a diameter of between 0.468 inches (1.189 cm) and 0.615 inches (1.56 cm) and terminates in a flared region 56.

The bore 58 of fitting 44 is typically 0.68 inches (1.73 cm) in diameter and has flared regions at either end. The bore 26 typically has a diameter of 0.75 inches (1.91 cm). It will be noted that the channel provided by bores 54, 58, and 26 becomes progressively wider from upper pipe element 48, to fitting 44, to bore 26. This construction facilitates manufacture of the reactor and provides guidance for flux thimble 60 (to be discussed shortly) while avoiding the possibility that it might become struck in the channel.

Flux thimble 60 is a long stainless steel tube which begins at a plate (known as a seal table, not illustrated) outside the reactor vessel 7 and which has a closed end (not illustrated) that is normally disposed inside a fuel assembly 16. Thimble 60 slidably extends through tube 25, guide 30, bore 26, bottom mounted instrumentation column 42, and sleeve 38. A stainless steel guide tube (not illustrated) is welded to the outer end of sleeve 36, and thimble 60 extends within the guide tube to the seal table, which is typically located in a shielded position at an elevation near the top of vessel 7. Since the interior of the vessel 7 is in fluid communication with the interior of sleeve 38, it will be apparent that the guide tube provides a pressure boundary which extends around thimble 60 from wall 15 to the seal table, where a high pressure seal (not illustrated) is provided between the inner wall of the guide tube (not illustrated) and the outer wall of thimble 60. The net result is that thimble 60 provides a low-pressure access channel into the reactor vessel 7 from a shielded position outside of the reactor vessel 7.

A flux detector (not illustrated), about 2 inches (5 cm) long, is slidably accommodated within thimble 60 and is attached to a flexible push-pull cable (not illustrated) which extends through thimble 60 to flux-mapping equipment (not illustrated) located beyond the seal table (not illustrated). At periodic intervals, typically once every 28 days, the flux detectors are pushed to the tops of thimbles 60 and are then slowly withdrawn through the fuel assemblies 16 as flux measurements are taken at different heights to provide neutron flux map of the interior of the reactor vessel 7.

Normally thimbles 60 remain inserted in the instrumentation tubes 25 of the randomly selected fuel assemblies 16 between the periodic flux mapping operatons. Thimbles 60 must be withdrawn from fuel assemblies 16, however, at intervals of 12–18 months when the reactor 6 is shut down for refueling and fuel shuffling. During the refueling operation the nuclear reaction is terminated, the pressure within the reactor vessel 7 is relieved, and the guide tubes (not illustrated) are unsealed from the thimbles 60 at the seal table (not illustrated). The thimbles 60 (which are somewhat flexible) are then withdrawn by a distance of about 14 feet (4.27 meters) to free them frm the spent fuel assemblies 16, which are thereupon removed via remote control and replaced by fresh fuel assemblies 16. Thimbles 60 are then driven into the fresh fuel assemblies 16, the reactor vessel 7 and seal table are sealed, and power generation begins anew.

The conventional thimble guide 30 of FIG. 2 has several shortcomings. It has been found that considerable turbulence exists during operation of a reactor 6 in the region between the upper surface of core plate 14 and the lower surfaces of platform portions 20 of fuel assemblies 16. Guides 30 expose a significant portion of thimbles 60 to this turbulence, which may, depending on dimensional tolerances, vibrate thimbles 60 and increases wear to an undesirable extent. Simply increasing the length of guides 30 would be undersirable because fuel assembly designs may change, including the lengths of legs 18. Since guides 30 are permanently installed at the time the vessel 7 is built, any particular length for guides 30 that is selected at that time might make it impossible to take advantage of future design improvements in fuel assemblies. Even apart from this consideration, it would be undesirable to make solid guides 30 long enough to touch the bottom nozzles 17 of a particular fuel assembly design because very slight dimensional inaccuracies might upset the footing of legs 18 and leave the fuel assemblies tottering on top of one or more guides 30. Furthermore, it has been found that fluid flow in the gap around a thimble 60 due to the progressively widening channel from element 48 to fitting 44 to bore 26 may be sufficient to cause vibrations which increase wear.

SUMMARY OF THE INVENTION

Accordingly, an object of the present invention is to provide an extender which telescopically cooperates with the thimble guide, so that the effective length of the thimble guide and extender together can be varied, and which contacts the bottom nozzle of a fuel assembly to provide a shielded passage for the thimble right up to the bottom nozzle.

Another object of the present invention is to provide a thimble guide extender which can be retrofitted for use with existing nuclear reactors.

Another object of the invention is to provide a thimble guide extender which creates a continuous flow path up through the bottom mounted instrumentation cloumn and into the fuel assembly, thereby reducing vibration caused by axial flow of coolant in addition to providing protection from cross-flows and the resulting vibrations.

Another object of the present invention is to provide a thimble guide extender which is permanently mounted to the bottom of a fuel assembly and which accommodates slight horizontal misalignments between the bottom nozzle and the thimble guide.

Another object of the present invention is to provide a thimble guide extender which is securely mounted to the thimble guide and which, moreover, is locked to retain its position.

Another object of the present invention is to provide a thimble guide extender having self-contained moving parts in order to avoid the danger that elements might become adrift in the reactor coolant system.

These and other objects are attained by providing a thimble guide extender which includes a hollow element having a thimble passage, the hollow element being provided with an upper portion which contacts the bottom nozzle of the fuel assembly and a lower portion which extends around the sides of the thimble guide, so that the upper end of the thimble guide is disposed within the hollow element, and means for mounting the element so that the axis of the thimble passage is substantially coaxial with respect to the channel through the thimble guide.

DESCRIPTION OF THE PREFERRED EMBODIMENTS

Figure 3:
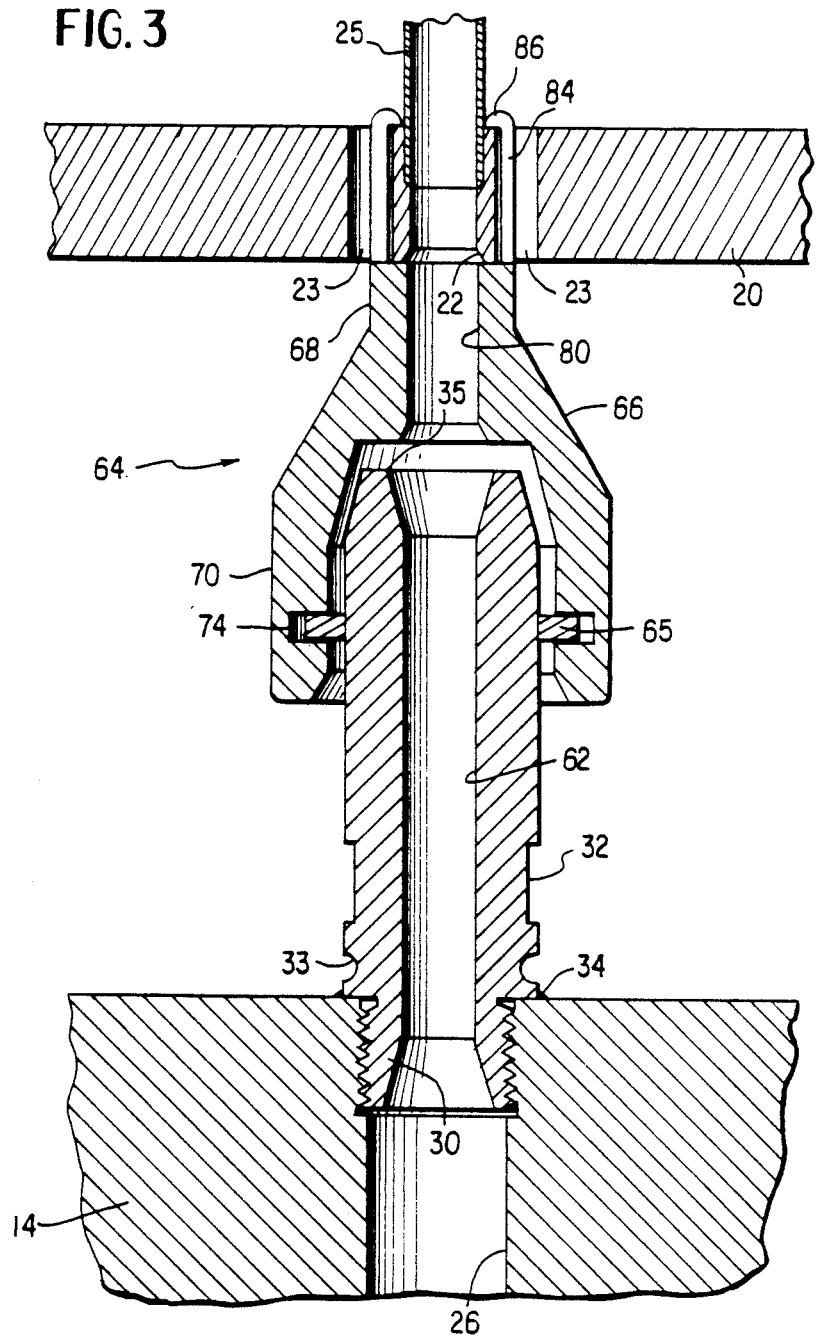
FIG. 3 is a sectional view illustrating an embodiment of the thimble guide extender of the present invention.
Figure 6:
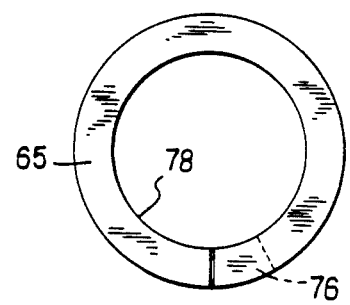
FIG. 6 is top plan view of the sealing ring in FIG. 3.
Figure 7:
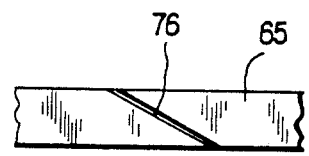
FIG. 7 is front elevational view, partially broken away, illustrating the oblique cut in the sealing ring in FIG. 3.

In FIG. 3, a conventional thimble guide 30 is mounted at the bore 26 of core plate 14 in the manner previously discussed. The axis of thimble guide channel 62 extends through bore 26 and through aperture 22 in the platform portion 20 of a fuel assembly. Thimble guide extender 64 of the present invention includes a sealing ring 65 and hollow cap element 66, which has an upper portion 68 in contact with the platform portion 20 of the bottom nozzle of the fuel assembly and a lower portion 70 which envelopes the upper end of guide 30. Ring 65 is loosely confined in annular grove 74 in bottom portion 70. As will be seen from FIGS. 6 and 7, ring 65 is provided with an oblique cut 76, so that ring 65 acts as a spring whose inner opening 78 is biased against the outer wall of guide 30.

Figure 4:
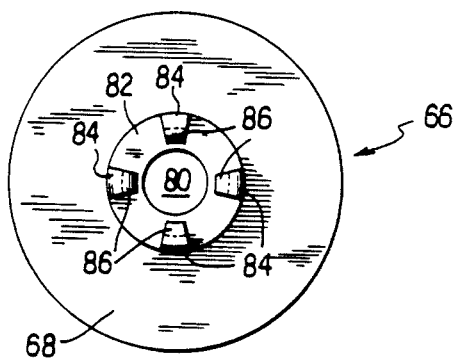
FIG. 4 is a top plan view of the hollow cap element in FIG. 3.
Figure 5:
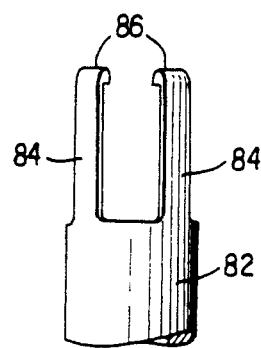
FIG. 5 is a perspective view, partially broken away, illustrating the attachment prongs of the hollow cap element in FIG. 3.

With reference next to FIGS. 4 and 5 in addition to FIG. 3, upper portion 68 of cap element 66 is provided with a thimble passage 80 which serves as a continuation of channel 62. Upper portion 68 includes a cylindrical wall 82 from which extend four resilient locking fingers 84 which terminate in hooked portion 86.

Figure 1:
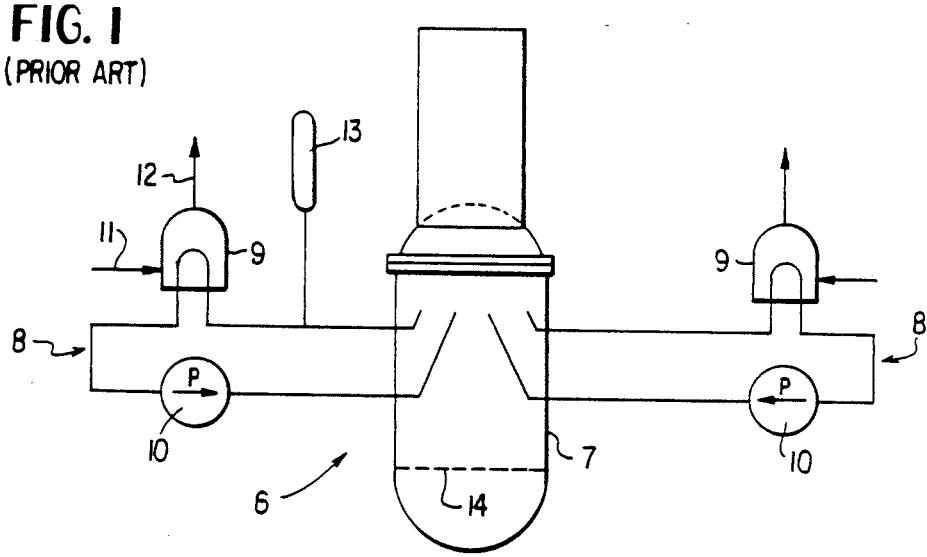
FIG. 1 schematically illustrates major operative elements of a typical pressurized water reactor.
Figure 2:
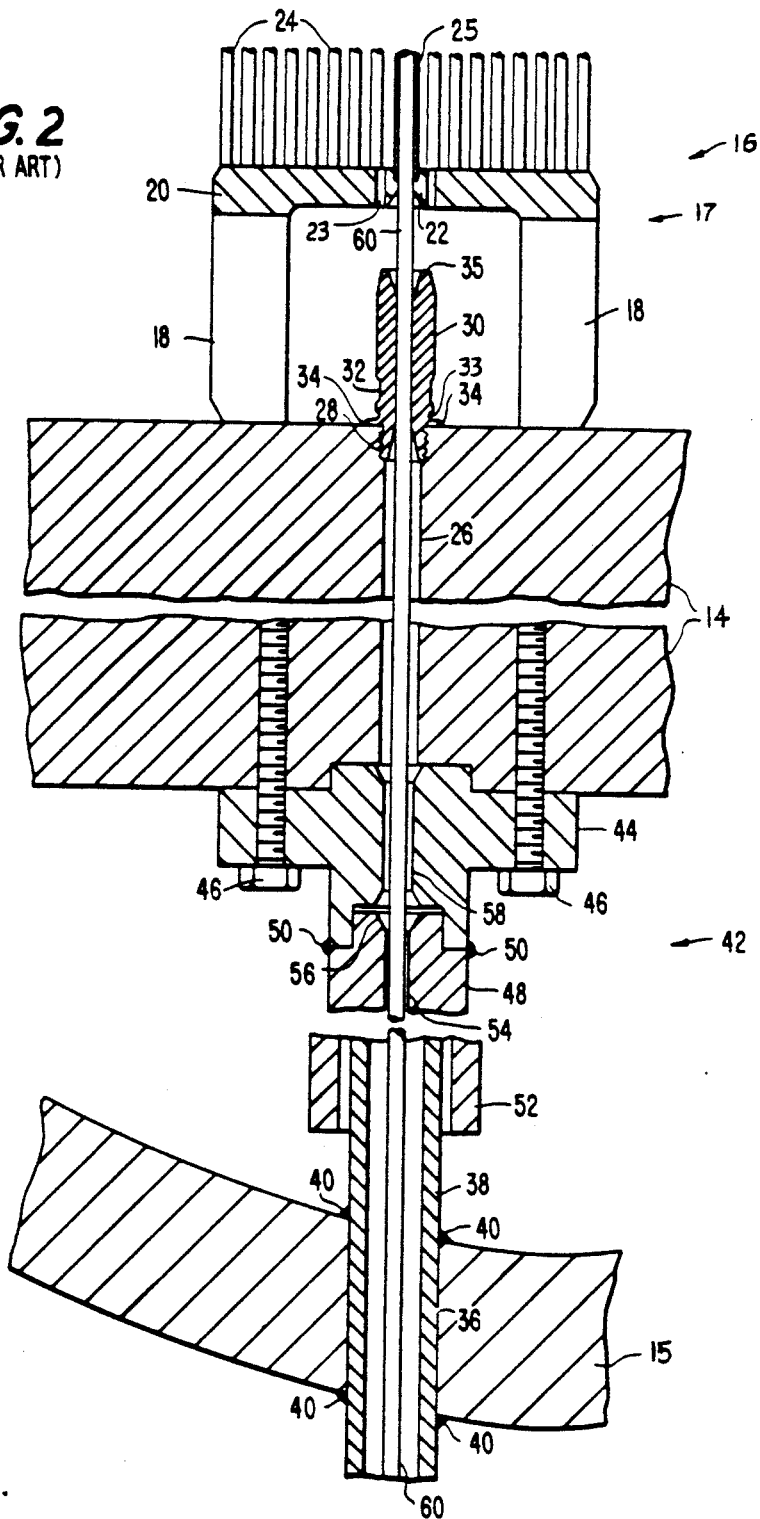
FIG. 2 is a sectional view generally illustrating features within the reactor vessel of FIG. 1, including the core plate and a fuel assembly supported by the core plate.

Returning to FIG. 3, the use of thimble guide extender 64 will now be explained. Before a fuel assembly is loaded into vessel 7 (see FIG. 1), extender 64 is attached to the platform portion 20 of the lower nozzle of a fuel assembly by remote control. This is accomplished by moving extender 64 axially toward the bottom nozzle so that fingers 84 enter the four flow openings 23 adjacent the central aperture 22 and hooked portion 86 snap into place. This permanently connects the extender 64 to the bottom nozzle of the fuel assembly. When the fuel assembly is thereafter lowered into the vessel 7, the upper end of guide 30 enters opening 78 of ring 65, which slides down the sides of guide 30 until legs 18 (see FIG. 2) rests against plate 14. Annular groove 74 is made slightly oversized so that a slight horizontal displacement of the fuel assembly with respect to guide 30 can be accommodated. That is, groove 74 permits the fuel assembly to be installed in such a manner that the axis of passage 80 is parallel to but slightly displaced from the axis of channel 62. For purposes of this application a slight displacement of the axes of channel 62 and passage 80 will nevertheless be deemed "substantially coaxial" if the displacement is not greater than 4 millimeters. Normally it is expected that the axes of channel 62 and passage 80 will be separated by less than half and preferably less than a quarter of this amount.

Figure 8:
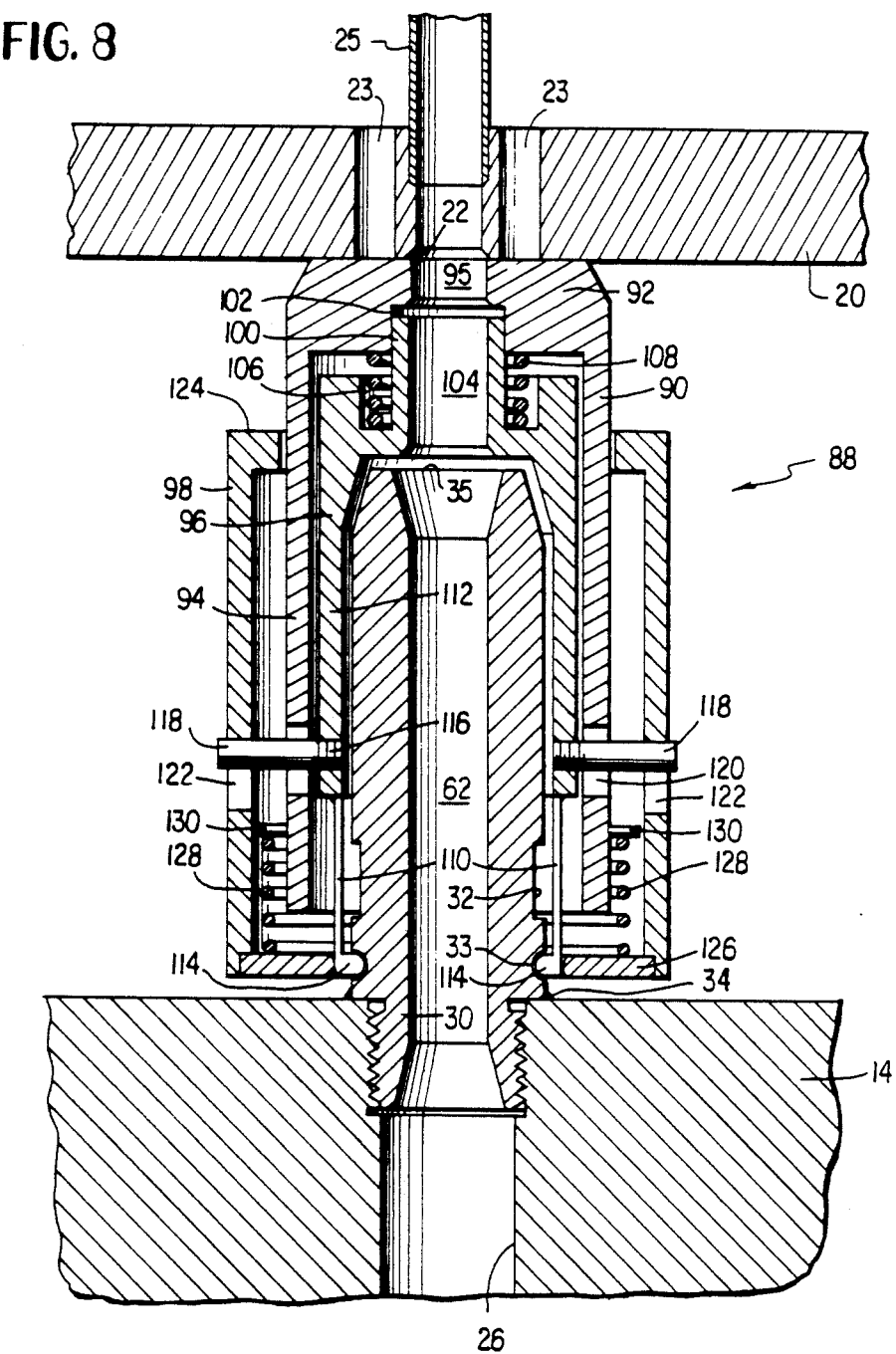
FIG. 8 is a sectional view of a second embodiment of the thimble guide extender of the present invention.

Turning next to FIG. 8, which illustrates the second embodiment of the present invention, thimble guide extender 88 includes a hollow cap element 90 having an upper portion 92 which contacts the platform portion 20 of the lower nozzle of a fuel assembly and having a lower portion 94 which surrounds at least the upper end of thimble guide 30. Upper portion 92 is provided with a thimble passage 95 having an axis that is substantially coaxial with respect to the axis of thimble guide channel 62. Inner element 96 is disposed radially inward of cap element 90 and outer element 98 is disposed radially outward. Elements 90, 96, and 98 fit one inside the other. The spacing between elements 90, 96, and 98 is exaggerated in FIG. 8 to facilitate illustration.

At its upper end, inner element 96 is provided with a cylindrical projection 100 which slidingly engages surface 102 of cap element 90. Enclosed by projection 100 is a further thimble passage 104 which communicates between channel 62 and passage 95. Annular slot 106 is provided around projection 100 to accommodate spring 108, which biases portion 92 upward against the underside of platform portion 20.

With continuing reference to FIG. 8, resilient spring fingers 110 extend downward from cylindrical wall 112 of inner element 96. In the illustrated embodiment four spring fingers 110 are employed, although three fingers or some other number may be used. Fingers 110 terminate in enlarged regions 114 which engage groove 33 to attach element 96 to guide 30. The inner sides of regions 114 are shaped to conform to groove 33 and the outer sides are rounded, and protrude slightly further outward than the outer surfaces of fingers 110.

Finger 110 and enlarged regions 114 may be provided as follows: During fabrication of element 96, the workpiece (not illustrated) is machined to have a generally cylindrical portion (not illustrated) which will become wall 112, fingers 110, and regions 114. This is, the upper part of this cylindrical portion has inner and outer diameters appropriate for wall 112, below this the cylindrical portion has inner and outer diameters appropriate for fingers 112, and below this the cylindrical portion is configured to provide enlarged regions 114. Thereafter, appropriate sections of the cylindrical portion are removed to provide separate fingers 110 and regions 114.

With continuing reference to FIG. 8, wall 112 of inner element 96 is provided with threaded openings 116 to receive corresponding threads on pegs 118. Pegs 118 project radially outward through slots 120 in element 96 and slots 122 in element 98.

The upper end of element 98 is provided with an enlarged ring region 124 that is closely spaced from the side of element 90 to provide alignment and guidance for element 98. A locking ring 126 is affixed by pegs (not illustrated) to the lower end of element 98 and provides support for spring 128. The other end of spring 128 is anchored by pegs 130, which are affixed to cap element 94. The spring constant of spring 128 is less than that of spring 108. The inner edge of the locking ring 126 is rounded and extends inward far enough to lightly touch enlarged region 114.

Prior to installation of thimble guide extender 88, spring 108 biases cap element 90 away from inner element 96, so that pegs 118 engage the bottoms of slots 120. Furthermore, spring 128 biases outer element 98 away from cap element 90, so that pegs 118 engage the tops of slots 122. Extenders 88 may, of course, be installed during fabrication of a new reactor vessel, but they may also be installed by remote control when an existing reactor is shut down for refueling, or manually by shielded divers who limit their exposure. During installation outer element 98 is pulled upward, against the restoring force of spring 128, until the bottoms of slots 122 are engaged by pegs 118. This withdraws the inner edge of the locking ring 126 from its normal position against enlarged region 114. Extender 88 is then deposited on a guide 30 and lowered, with spring fingers 110 flexing slightly, until regions 114 sink into groove 33. Outer element 98 is then released, whereupon spring 128 forces element 98 to its lower position. In this position the inner edge of the ring 126 lies adjacent regions 114 and locks regions 114 into place, so that they cannot be dislodged inadvertently from groove 33. When a fuel assembly is subsequently lowered onto extender 88, spring 108 biases upper portion 92 of cap element 90 against the platform portion 20 of the fuel assembly's bottom nozzle. The downward movement of the fuel assembly is limited by the length of legs 18 (see FIG. 2) rather than be extender 88, and as will be noted from FIG. 8 slots 120 and the upper portion of inner element 96 are configured to permit further downward motion of cap element 90 even when platform portion 20 is in its final position, as illustrated.

Figure 9:
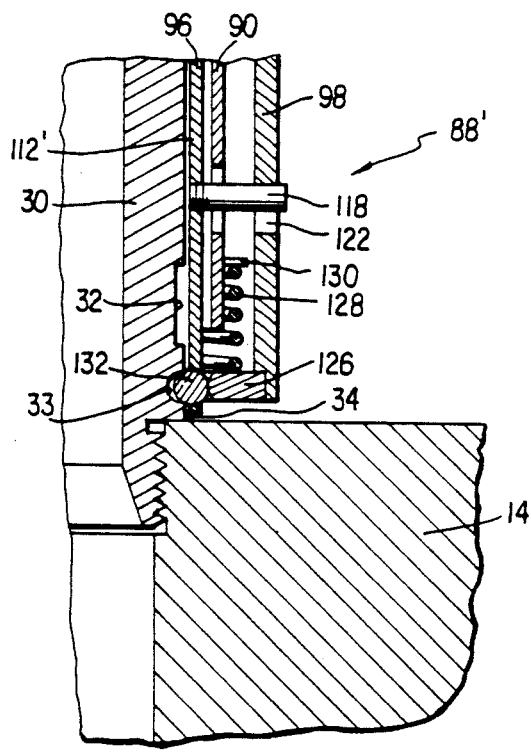
FIG. 9 is a sectional view, partially broken away, illustrating a modification of the second embodiment of the present invention.

FIG. 9 illustrates a portion of a modified extender 88' which is similar to extender 88 of FIG. 8 but is secured to guide 30 by captured locking balls 132 rather than spring fingers 110 and enlarged regions 114. In FIG. 9, modified cylindrical wall 112' of element 96 is provided with drilled openings (not numbered) spaced closely adjacent the lower end of wall 112'. Locking ring 126 is closely machined to provide a sliding fit between balls 132 and the locking ring. Each ball 132 is retained in its respective opening by staking the metal of wall 112' adjacent the opening and on either side of wall 112', thus distorting the metal and capturing the ball 132.

It will be understood that the above description of the present invention is susceptible to various modifications, changes, and adaptations, and the same are intended to be comprehended within the meaning and range of equivalence of the appended claims.

We claim:

1. In a nuclear reactor having a reactor lower core plate with a bore therein and having a thimble guide with a bottom end that is mounted on the reactor lower core plate, a top end that is spaced apart from an aperture in the bottom nozzle of a fuel assembly supported by the core plate, and sides defining an elongated guide channel between the top and bottom ends to accommodate an elongated hollow thimble which is longitudinally movable through the bore and into the aperture, the bottom nozzle having legs which rest on the core plate around the bore and having flow openings adjacent the aperture, and the guide channel having an axis which extends through the bore and the aperture, a thimble guide extender comprising:
    a hollow element having a thimble passage with an axis, said hollow element having an upper portion which contacts said bottom nozzle of said fuel assembly and a lower portion which extends around said sides of said thimble guide so that said upper end of said guide is disposed within said hollow element; and
    means for mounting said hollow element so that said thimble passage axis is coaxial with respect to said axis of said guide channel, said means for mounting including locking fingers on said upper portion of said hollow element to extend into said flow openings and secure said hollow element to said bottom nozzle.

2. The extender of claim 1, wherein said means for mounting further comprises hooks secured to said locking fingers.

3. The extender of claim 1, wherein said lower portion of said hollow element surrounds at least the upper quarter of said guide nozzle.

4. The extender of claim 1, wherein said lower portion of said hollow element has an annular groove facing said thimble guide, and further comprising a sealing ring loosely confined in said annular groove.

5. The extender of claim 4, wherein said sealing ring has an oblique cut so that said sealing ring can be expanded by said thimble guide.

6. The extender of claim 1, where said upper and lower portions of said hollow element comprise a single, unitary structure.

7. In a nuclear reactor having a reactor lower core plate with a bore therein and having a thimble guide with a bottom end that is mounted on the reactor lower core plate, a top end that is spaced apart from an aperture in the bottom nozzle of a fuel assembly supported by the core plate, and sides defining an elongated guide channel between the top and bottom ends to accommodate an elongated hollow thimble which is longitudinally movable through the bore and into the aperture, the bottom nozzle having legs which rest on the core plate around the bore and the guide channel having an axis which extends through the bore and the aperture, a thimble guide extender comprising:
    a hollow element having a thimble passage with an axis, said hollow element having an upper portion which contacts said bottom nozzle of said fuel assembly and a lower portion which extends around said sides of said thimble guide so that said upper end of said guide is disposed within said hollow element, said lower portion of said hollow element having a slot therein; and
    means for mounting said hollow element so that said thimble passage axis is coaxial with respect to said axis of said guide channel, said means for mounting including
        an inner element which is disposed within said hollow element, said inner element additionally being hollow,
        means for affixing said inner element to said thimble guide,
        a peg affixed to said inner element and extending through said slot,
        a spring biassing said hollow element away from said inner element, and
        means for locking said means for affixing to selectively prevent said inner element from becoming detached from said thimble guide,
    wherein said means for locking includes an outer element having a slot therein, said outer element being hollow and being disposed around said hollow element with said peg extending through said slot in said outer element, means for biassing said outer element away from said hollow element, and means disposed on said outer element for selectively restricting the movement of said means for affixing.

8. The extender of claim 7, wherein said thimble guide has an annular groove therein, and wherein said means for affixing comprises a spring finger affixed to said inner element, and an enlarged region affixed to said spring finger to engage said groove.

9. The extender of claim 7, wherein said thimble guide has an annular groove therein, wherein said inner element has an opening therein, and wherein said means for affixing comprises a ball captured in said opening and urged toward said groove.

10. The extender of claim 7, wherein said means disposed on said outer element comprises a locking ring encircling said thimble guide.

11. The extender of claim 10, wherein at least a portion of each of said inner element, said hollow element, and said outer element comprises a respective cylindrical wall segment, said cylindrical wall segments being substantially coaxially disposed.

12. In combination with the nuclear reactor, the thimble guide extender of claim 1.

* * * * *